Mar. 6, 1923.
J. T. PARR.
SAFETY DEVICE FOR AIRCRAFT.
FILED JULY 13, 1921.
1,447,425.
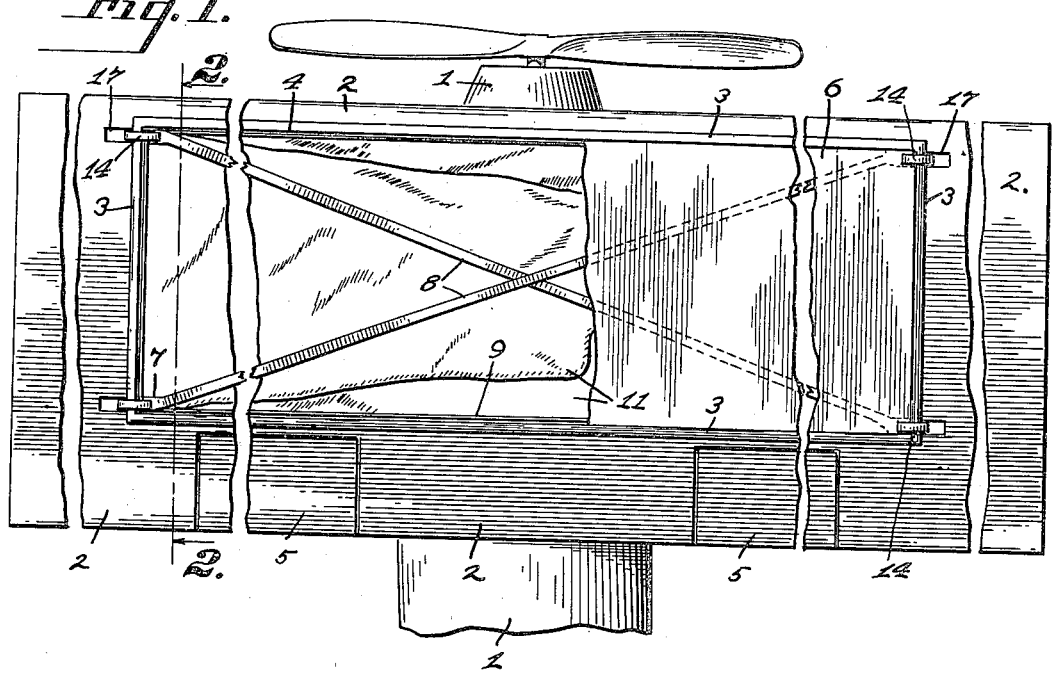
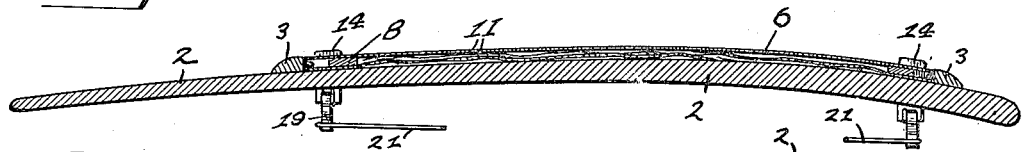
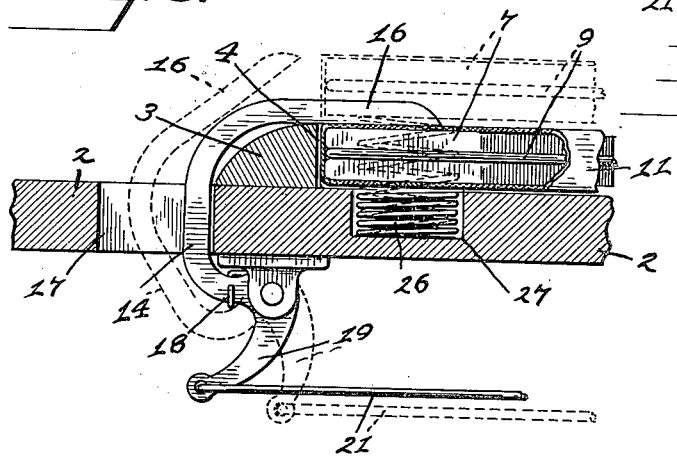
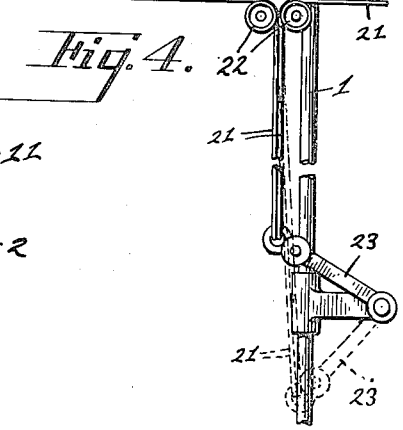
Inventor
John T. Parr
By Arthur L. Slee
Atty.

Mar. 6, 1923.
J. T. PARR.
SAFETY DEVICE FOR AIRCRAFT.
FILED JULY 13, 1921.
1,447,425.
2 SHEETS—SHEET 2.
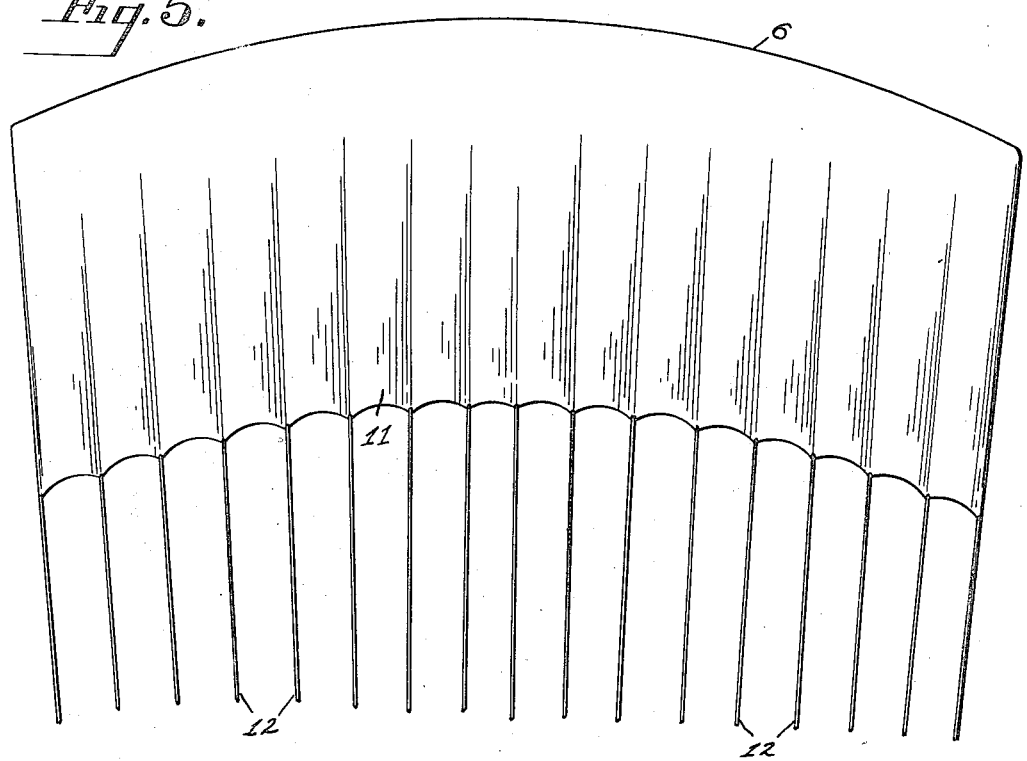
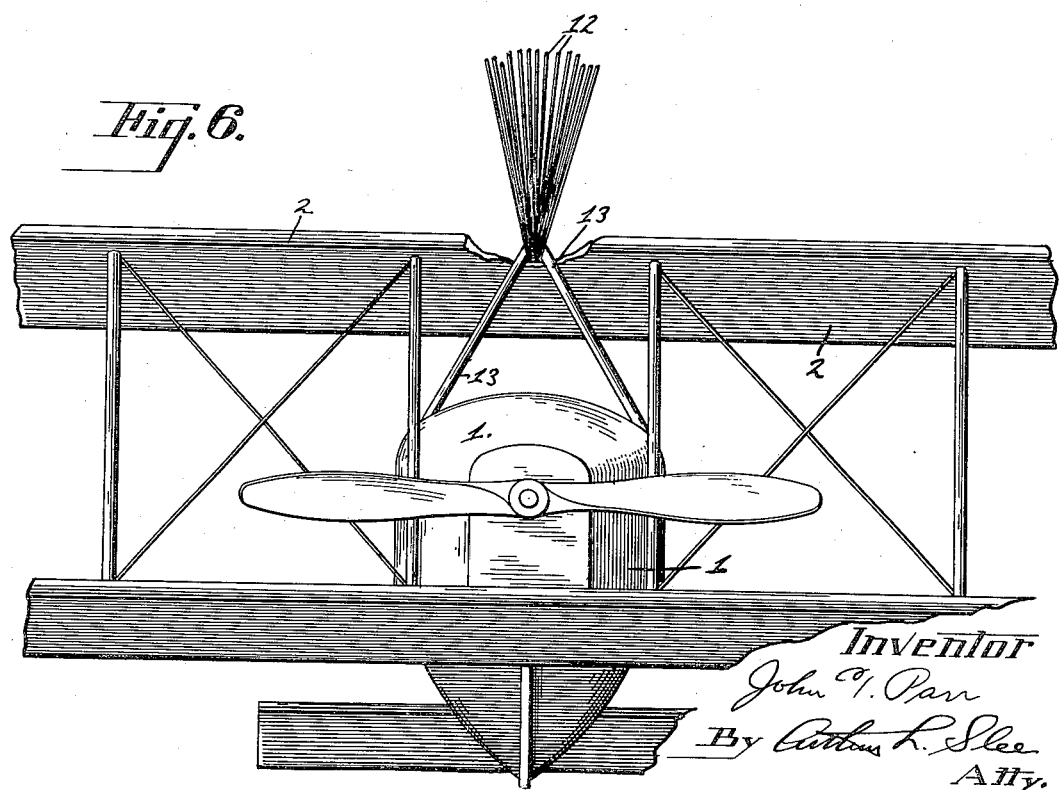

Patented Mar. 6, 1923.

1,447,425

UNITED STATES PATENT OFFICE.

JOHN T. PARR, OF OAKLAND, CALIFORNIA.

SAFETY DEVICE FOR AIRCRAFT.

Application filed July 13, 1921. Serial No. 484,409.

*To all whom it may concern:*

Be it known that I, JOHN T. PARR, a citizen of the United States, residing in the city of Oakland, county of Alameda, and State of California, have invented a new and useful Improvement in a Safety Device for Aircraft, of which the following is a specification.

My invention relates to improvements in safety devices for aeroplanes and the like wherein a parachute, normally carried upon the upper plane in a folded inoperative position, is arranged to be released to an operative position to retard the fall of the aeroplane and its occupants in case of accident while flying.

The primary object of my invention is to provide an improved aeroplane parachute.

Another object is to provide an improved safety device for air craft arranged to save both the aeroplane and its occupants should an accident occur while flying.

A further object of my invention is to provide an improved parachute arranged to be stored in an inoperative position upon the upper plane of an aeroplane without materially increasing the wind resistance of the plane.

A still further object is to provide improved means for releasing a parachute of the character described to insure opening of the parachute into an operative position.

I accomplish these and other objects by means of the device disclosed in the drawings forming a part of the present specification wherein like characters of reference are used to designate similar parts throughout said specification and in which:

Fig. 1 is a broken plan view of an aeroplane provided with my improved safety device;

Fig. 2 is an enlarged transverse section through the upper plane of the aeroplane taken along the line 2—2 of Fig. 1 in the direction indicated;

Fig. 3 is an enlarged detail of one corner of my parachute frame, disclosing the operation of my parachute retaining and releasing means;

Fig. 4 is an enlarged broken detail of the latch operating means;

Fig. 5 is a side elevation of my improved parachute in extended position; and

Fig. 6 is a broken front elevation of an aeroplane disclosing the manner in which the parachute is attached thereto.

Referring to the drawings the numberal 1 is used to desigate in general an areoplane having an upper plane 2 upon which are secured cleats 3 to form a recess 4 adapted to receive a parachute 6.

The parachute 6 consists of a frame 7 formed from a pair of crossed spreading elements 8 the ends of which are laterally and longitudinally connected by means of stay wires 9 secured therebetween. The spreader elements 8 are made from any strong light material having sufficient flexibility to permit yielding for a purpose hereinafter more fully explained. A cover 11 made from strong fabric or other suitable material is mounted over the frame 7, the edges of the cover extending beyond the frame equally upon all sides. A plurality of flexible supporting connections 12 are secured at regular intervals along the edge of the cover 11, and arranged to be attached to the aeroplane 1 by a hanger 13 secured upon the body of the aeroplane at the approximate center of gravity thereof so that the aeroplane will normally rest in a substantially horizontal position when suspended by the hanger 13.

The frame 7 is of a size adapted to fit neatly into the recess 4 formed by the cleats 3, and is preferably made rectangular in shape to permit the greatest possible area, the size being calculated to meet the requirements of different sizes of areoplanes. The width of the frame should be made as great as the width of plane 2, exclusive of the elevating wings 5, will permit. The cleats 3 are provided with rounded outer edges to reduce wind resistance when flying. The cover 11 is firmly stretched over the frame 7 to present a smooth upper surface and to prevent whipping in the wind.

The parachute is normally carried in the recess 4, the connections 12 and the overhanging portions of the cover 11 being compactly coiled and folded to occupy the lower portion of the recess 4, and the frame 7 pressed into engagement with the cleats 3 to close the upper portion of the recess, the spreader elements 8 being sufficiently flexible to conform to the curvature of the plane, Suitable latches 14 are mounted upon the plane 2 to engage the frame 7, preferably at the corners thereof, to hold the same in position within the recess 4. I have illustrated one form of latch suited for this purpose wherein the latches 14 are pivotally mounted upon the under side of the plane 2 and are provided with offset retaining arms 16 extending upwardly through apertures 17 to engage the corners of the frame 7. Springs 18 are mounted upon the pivot bearings to normally hold the latches in retaining position. An extension 19 upon each latch 14 receives an operating wire or cord 21 each carried over a pulley 22 to an operating lever 23 mounted upon the frame of the aeroplane within easy reach of the operator. The lever 23 is pivotally mounted and arranged to receive the wires 21 from all the latches 14, thereby causing all said latches to be moved simultaneously to release the parachute when the lever 23 is moved by the operator.

Springs 26 are mounted in recesses 27 at the corners of the recesses 4 to engage the corners of the frame 7. The frame 7 is forced into the recess 4 against the pressure of the springs 26 in order that when the frame 7 is released by the latches 14 it will be forced upwardly from the recess 4 to insure the entrance of air under the parachute to extend said parachute into an operative position. The springs 26 are arranged to exert a pressure less than that exerted by the springs 18 so that the frame will normally be held against the springs 26 by the latches 14.

In operation my improved parachute is mounted and carried upon the upper plane of an aeroplane as above described, the materials used being of a light and strong nature so that very little room will be required and the wind resistance of the plane will not be materially increased thereby causing no interfering with the flight of the aeroplane in the usual manner. In case of accident while flying, such as the breakage of any portion of the aeroplane, engine trouble, or an injury to the operator, a single downward movement of the operating lever 23 will release the parachute from the latches 14. The frame 7 will be moved away from the plane 2 by the springs 26 and the inrush of air thereunder will extend the parachute 6 into an operative position. The aeroplane 1 will now be carried suspended upon the connections 12 attached to the hanger 13, and the fall of the aeroplane and its occupants will be retarded so as to prevent violent impact with the earth and consequent serious damage to the machine or injury to the occupants.

The spreader elements 8 are sufficiently yieldable to permit the frame 7 to assume an arcuate shape when the aeroplane is suspended upon the connections 12, thereby distributing the supported weight evenly upon the cover 11 and effecting a substantially uniform resisting surface as the parachute 6 is moved downwardly against the resistance of the air.

From the above description it will be readily seen that I have provided an improved parachute adapted for carriage without impeding the machine and effective for both saving the lives of aviators and preventing loss of their aeroplanes when accidents or mishaps occur while flying. The construction of my improved parachute and of the retaining and releasing means is subject to wide variation in detail. I, therefore, do not restrict myself specifically to the precise construction disclosed but wish to avail myself of such modification as may fall within the scope of the appended claims.

Having thus described my invention what I claim as new and desire to secure by Letters Patent is:

1. A safety device for aeroplanes and the like comprising a parachute, said parachute consisting of a yieldable frame, a cover mounted over the frame and extending beyond the sides thereof and flexible attaching members secured at one end thereof to the edge of the cover and arranged to be attached to an aeroplane; means for normally retaining said parachute in a folded inoperative position upon the upper plane of the aeroplane; and means for releasing said parachute from said position to an operative extended position to retard the descent of said aeroplane.

2. A safety device for aeroplanes and the like comprising a parachute, said parachute consisting of a yieldable frame adapted to assume an arcuate shape when the parachute is in operation; a cover mounted over the frame and extending beyond the sides thereof, and a plurality of flexible attaching members secured to one end thereof to the edge of the cover and arranged to be secured to an aeroplane; means for normally retaining said parachute in a folded inoperative position upon the upper plane of said aeroplane; and means for releasing said parachute from said normal folded position to an operative extended position to retard the descent of the aeroplane.

3. A safety device for aeroplanes and the like comprising a parachute consisting of a yieldable frame adapted to assume an arcuate shape when the parachute is in operation; a fabric cover of greater area than the frame and mounted over said frame and extending beyond the sides thereof; and a plurality of flexible connecting members secured at one end thereof to the edges of the cover and arranged to be attached to an aeroplane; means for normally retaining said parachute in a folded inoperative position upon the upper plane of said aeroplane; and means for releasing said parachute from said folded position to an operative extended position to retard the descent of the aeroplane in case of accident while flying.

4. A safety device for aeroplanes and the like comprising a parachute consisting of a yieldable rectangular frame adapted to assume an arcuate shape when the parachute is in operation; a fabric cover of greater area than the frame mounted over said frame and extending beyond the sides and ends thereof, and a plurality of flexible connecting members secured at one end thereof to the edge of the cover and arranged to be attached to an aeroplane; means for normally retaining said parachute in folded inoperative position upon the upper plane of said aeroplane; and means for releasing said parachute from said normal folded position to an operative extended position to retard the descent of the aeroplane in case of accident while flying.

5. A safety device for aeroplanes and the like comprising a parachute consisting of a pair of crossed spreader elements; stay wires secured laterally and longitudinally between the ends of said spreader elements to form a frame adapted to assume an arcuate shape when the parachute is in operation; a fabric cover mounted over said frame and extending beyond the sides and ends thereof, and a plurality of flexible connections secured at one end thereof to the edges of the cover and arranged to be attached to an aeroplane; means for normally retaining said parachute in a folded inoperative position upon the upper plane of the aeroplane; and means for releasing said parachute from said normal folded position to an operative extended position to retard the descent of the aeroplane in case of accident while flying.

6. A safety device for aeroplanes and the like comprising a parachute consisting of a pair of crossed spreader elements; stay wires secured laterally and longitudinally between the ends of said spreader elements to form a frame adapted to assume an arcuate shape when the parachute is in operation; a fabric cover mounted over said frame and extending beyond the sides and ends thereof, and a plurality of flexible connections secured at one end thereof to the edges of the cover and arranged to be attached to an aeroplane; cleats secured upon the upper plane of said aeroplane to form a recess adapted to receive the parachute; means for normally retaining said parachute in a folded inoperative position within said recess, the frame being engaged by the cleats and the extending cover edges being folded under said frame; and means for releasing said parachute from said normal folded position to an operative extended position to retard the descent of the aeroplane in case of accident while flying.

7. A safety device for aeroplanes and the like comprising a parachute consisting of a pair of crossed spreader elements; stay wires secured laterally and longitudinally between the ends of said spreader elements to form a frame; a fabric cover mounted over said frame and extending beyond the sides and ends thereof, and a plurality of flexible connections secured at one end thereof to the edges of the cover and arranged to be attached to an aeroplane; cleats secured upon the upper plane of said aeroplane to form a recess adapted to receive the parachute in a normally inoperative position, the outer edges of the frame being engaged by the cleats and the extending portions of the cover being folded under the frame; latches mounted upon the plane to engage the frame at the corners thereof and normally retain the parachute in said folded inoperative position; and means for moving said latches to release the parachute into an operative extended position to retard the descent of the aeroplane in case of accident while flying.

8. A safety device for aeroplanes and the like comprising a parachute consisting of a pair of crossed spreader elements; stay wires secured laterally and longitudinally between the ends of said spreader elements to form a frame; a fabric cover mounted over said frame and extending beyond the sides and ends thereof, and a plurality of flexible connections secured at one end thereof to the edges of the cover and arranged to be attached to an aeroplane; cleats secured upon the upper plane of said aeroplane to form a recess adapted to receive the parachute in a normally inoperative position, the outer edges of the frame being engaged by the cleats and the extending portions of the cover being folded under the frame; a plurality of latches mounted upon the plane to engage the frame at the corners thereof and retain the parachute in said normal inoperative position within the recess; means controlled by the operator of the aeroplane for moving said latches simultaneously to release the parachute from folded inoperative position to an operative extended position to retard the descent of the aeroplane.

9. A safety device for aeroplanes and the like comprising a parachute consisting of a pair of crossed spreader elements; stay wires secured laterally and longitudinally between the ends of said spreader elements to form a frame; a fabric cover mounted over said frame and extending beyond the sides and ends thereof, and a plurality of flexible connections secured at one end thereof to the edges of the cover and arranged to be attached to an aeroplane; cleats secured upon the upper plane of said aeroplane to form a recess adapted to receive the parachute in a normally inoperative position, the outer edges of the frame being engaged by the cleats and the extending portions of the cover being folded under the frame; and retain the parachute in said normal inoperative position within the recess; means controlled by the operator of the aeroplane for moving said latches simultaneously to release the parachute from the inoperative position; and means mounted within the recess for moving the frame outwardly therefrom when released by the latches to permit the entrance of air thereunder to extend the parachute into an operative position for retarding the descent of the aeroplane.

10. A safety device for aeroplanes and the like comprising a parachute consisting of a pair of crossed spreader elements; stay wires secured laterally and longitudinally between the ends of said spreader elements to form a frame; a fabric cover mounted over said frame and extending beyond the sides and ends thereof, and a plurality of flexible connections secured at one end thereof to the edges of the cover and arranged to be attached to an aeroplane; cleats secured upon the upper plane of said aeroplane to form a recess adapted to receive the parachute in a normally inoperative position, the outer edges of the frame being engaged by the cleats and the extending portions of the cover being folded under the frame; a plurality of latches mounted upon the plane to engage the frame; a plurality of latches mounted upon the plane to engage the frame and retain the parachute in said normal inoperative position within the recess; means controlled by the operator of the aeroplane for moving said latches simultaneously to release the parachute from the inoperative position; and springs mounted within the recess to engage the frame for moving said frame outwardly from the recess when released by the latches to permit entrance of air to extend the parachute into an operative position for retarding the descent of the aeroplane.

In witness whereof I hereunto set my signature.

JOHN T. PARR.